United States Patent [19]

Ganser et al.

[11] Patent Number: 4,471,269
[45] Date of Patent: Sep. 11, 1984

[54] CIRCUIT ARRANGEMENT FOR OPERATING A HIGH-PRESSURE GAS DISCHARGE LAMP

[75] Inventors: Hans G. Ganser, Stolberg; Ralf Schäfer, Aachen; Hans P. Stormberg, Stolberg, all of Fed. Rep. of Germany

[73] Assignee: U.S. Philips Corporation, New York, N.Y.

[21] Appl. No.: 447,842

[22] Filed: Dec. 8, 1982

[30] Foreign Application Priority Data

Dec. 14, 1981 [DE] Fed. Rep. of Germany ....... 3149526

[51] Int. Cl.³ .......................................... H05B 41/24
[52] U.S. Cl. .................................. 315/307; 315/205; 315/208; 315/224; 315/283; 315/DIG. 7
[58] Field of Search .................. 315/205, 208, 209 R, 315/224, 283, 307, 308, DIG. 7

[56] References Cited

U.S. PATENT DOCUMENTS 4,042,856  8/1977  Steigerwald .................... 315/307 X Primary Examiner—Eugene R. Laroche
Attorney, Agent, or Firm—Robert T. Mayer; Bernard Franzblau

[57] ABSTRACT

A circuit arrangement for operating a high-pressure gas discharge lamp (14) with high frequency current in which a direct voltage is supplied to a transistor bridge (5 to 8) having a transverse branch in which is arranged a choke coil (13). The clock (switching) frequency of the transistor bridge is varied within each period of the AC mains alternating voltage in dependence upon the current derived from the AC mains voltage.

9 Claims, 9 Drawing Figures

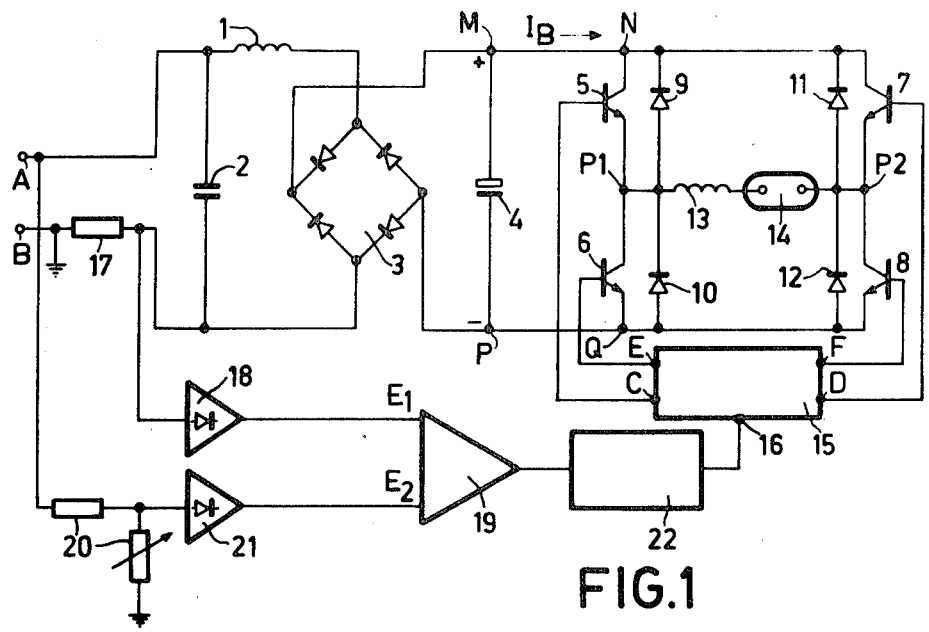
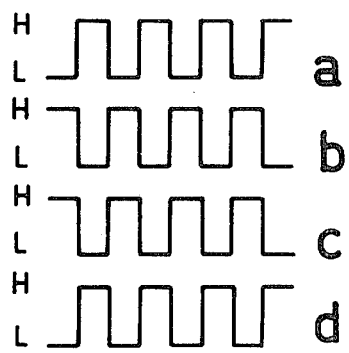
FIG.2
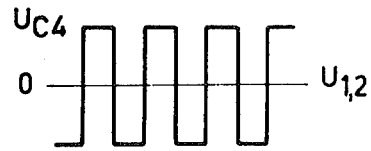
FIG.3
FIG.4
FIG.5

CIRCUIT ARRANGEMENT FOR OPERATING A HIGH-PRESSURE GAS DISCHARGE LAMP

The invention relates to a circuit arrangement for operating a high-pressure gas discharge lamp with high frequency current, the arrangement comprising a full-wave rectifier designed to be connected to a conventional a.c. mains and to supply a direct voltage to a bridge circuit comprising four transistors, a choke coil being connected in series with the lamp.

The term "high-pressure gas discharge lamp" particularly includes mercury vapour-, sodium- and metal halide high-pressure gas discharge lamps. The high frequency current with which the lamps are operated can be either an alternating current or a pulsatory direct current. In the case of alternating current operation, the lamp is arranged together with the choke coil in a transverse branch of the transistor bridge, whereas in the case of pulsatory direct current operation the lamp is arranged between the full-wave rectifier and the transistor bridge. The high frequency of the current may lie, for example, between 1 and 100 kHz.

A transistor bridge, comprising four power field effect transistors (VMOS), in whose transverse branch is arranged a low-pressure gas discharge lamp with its choke coil is known from ITT Publication "VMOS Application Ideas", 1979.

If such bridge circuits are supplied from an a.c. mains, a mains deformation occurs, in particular when high-pressure lamps are used instead of low-pressure lamps. This is due to the fact that the resistance of high-pressure gas discharge lamps varies by a factor of 3 to 10 during each half wave of the mains alternating voltage with a constant ballast impedance. The accurate value of this variation depends upon the lamp data, such as, for example, the mercury vapour pressure, the volume of the discharge vessel or the addition of metal halides and the like. Due to this variation of the lamp resistance with a sinusoidal mains alternating voltage, a non-sinusoidal current is derived from the mains.

It is known per se from U.S. Pat. No. 4,042,856 that in a circuit arrangement for operating a high-pressure gas discharge lamp, in which only the lamp is arranged in the transverse branch of a transistor bridge connected behind a forward converter, the forward converter is controlled in dependence upon the lamp current. For this purpose, a part of the alternating voltage is rectified and supplied through a control function generator to a comparator whose other input has applied to it a voltage proportional to the lamp current. The comparator output signal controls the switching transistor of the forward converter, as a result of which the lamp current is influenced. A choke coil in the transverse branch of the transistor bridge as a ballast impedance for the lamp is not provided here.

The invention has for its object to ensure that in a circuit arrangement for operating high-pressure gas discharge lamps a substantially sinusoidal current is derived from the a.c. mains with the aid of simple means, that is to say without the use of a control function generator.

According to the invention, in a circuit arrangement of the kind mentioned in the preamble, this is achieved in that the choke coil is present in a transverse branch of the bridge circuit, and the clock frequency of the transistor bridge is varied, within each period of the mains alternating voltage, in dependence upon the current derived from the a.c. mains.

Thus, the impedance of the choke coil arranged in the transverse branch of the transistor bridge is varied so that an overall resistance as constant as possible of lamp and ballast impedance is obtained and hence a sinusoidal current is derived from the a.c. mains.

According to a preferred embodiment of the invention, the circuit arrangement is constructed so that across a resistor arranged in a current supply lead to the full-wave rectifier a voltage proportional to the mains alternating current is derived and supplied through a rectifier to a first input of a differential amplifier. A part of the mains alternating voltage is supplied to a further rectifier and thence to a second input of the differential amplifier, the output of which is connected to a voltage-controlled pulse oscillator which produces pulses having a frequency dependent upon the output signal of the differential amplifier. The pulses are supplied to a control circuit for the transistor bridge.

In order that the invention may be readily carried into effect, an embodiment will now be described by way of example with reference to the accompanying drawing, in which:

FIG. 1 shows a circuit arrangement for operating a high-pressure gas discharge lamp with a choke coil arranged in the transverse branch of a transistor bridge;

FIG. 2 shows the pulse diagrams for controlling the transistor bridge;

FIG. 3 shows the voltage variation across the transverse branch of the transistor bridge;

FIG. 4 shows the variation of the current through the lamp;

FIG. 5 shows the variation of the current through the transistor bridge;

Figure 6:
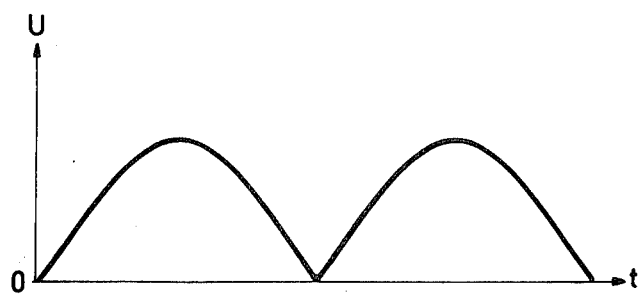
FIG. 6 shows the reference signal derived from the mains alternating voltage at the input of a differential amplifier in the circuit of FIG. 1.

A and B designate input terminals for connection to an a.c. mains of, for example, 220 V, 50 Hz. These input terminals have connected to them through a high-frequency mains filter, comprising a filtering coil 1 and a filtering capacitor 2, a bridge rectifier 3 comprising four diodes, a capacitor 4 being connected parallel to the output of this rectifier.

The rectifier arrangement 3, 4 constitutes a direct voltage source, to which is connected a bridge circuit comprising four transistors 5 to 8. Parallel to each of the transistors 5 to 8 is arranged a protection diode 9 to 12. A transverse branch of the bridge circuit accommodates a high-pressure gas discharge lamp 14 connected in series with a choke coil 13. The arrangement does not comprise a switching mains component. The protection diodes 9 to 12 serve to protect the transistors against voltages induced in the choke coil 13 when the transistor bridge is switched.

The base of each of the transistor 5 to 8 is fed, from the outputs C to F of a transistor control circuit 15, with rectangular switching signals having high clock frequency (with respect to the mains frequency) of the order of 1 to 100 kHz. The outputs C to F are connected so that the transistors 5 and 8 are switched each time to the "High" (H) signal state (FIGS. 2a and 2d), while the transistors 6 and 7 are in the "Low" (L) state (FIG. 2b and 2c), and conversely. FIG. 2a shows the pulse diagram at the output C of the transistor control circuit 15, FIG. 2b at the output D, FIG. 2c at the output E and FIG. 2d at the output F.

The clock frequency of the control circuit 15 is then adjusted by the pulse frequency of a pulse sequence appearing at its input 16, the production of which will be disclosed further hereinafter.

If the outputs C and F are in the H-signal state, the transistors 5 and 8 become conducting, while the transistors 6 and 7 are cut off. The point P1 of the transverse branch of the bridge circuit is then connected to the positive side of the capacitor 4 and the point P2 of the transverse branch of the bridge circuit is connected to the negative side of the capacitor 4. When the outputs D and E of the control circuit are in the H-signal state, the transistors 6 and 7 become conducting and the transistors 5 and 8 are cut off, so that P1 is now connected to the minus side and P2 to the plus side of the capacitor 4. Thus, the voltage $V_{1,2}$ between the points P1 and P2 schematically has the outer appearance shown in the time diagram of FIG. 3, its height depending upon the voltage $U_{C4}$ applied across the capacitor 4. Since the capacitor 4 is generally chosen to be small ($\lesssim 1$ $\mu$F), $U_{C4}$ substantially corresponds to the instantaneous value of the rectified mains alternating voltage so that the high-frequency voltage $U_{C4}$, shown in FIG. 3, has a sinusoidal 100 Hz envelope. The voltage $U_{1,2}$ is then supplied through the choke coil 13 to the lamp 14 so that the choke coil 13 acts as a ballast impedance. The result is that in the lamp 14 the high-frequency current variation $I_L$, shown diagrammatically in FIG. 4, is obtained, which also has a 100 Hz envelope.

Since the clock frequency for controlling the transistors 5 to 8 is high with respect to the mains frequency, the choke coil 13 can be small—as compared with a conventional 50 Hz choke coil—and can nevertheless be utilized as a ballast impedance.

The high frequency variations of the lamp current give rise to high-frequency variations of the current $I_B$ through the transistor bridge (FIG. 5) and hence of the current derived from the a.c. mains. In order to avoid this, these high-frequency components are filtered out with the aid of the mains filter 1,2.

Figure 7:
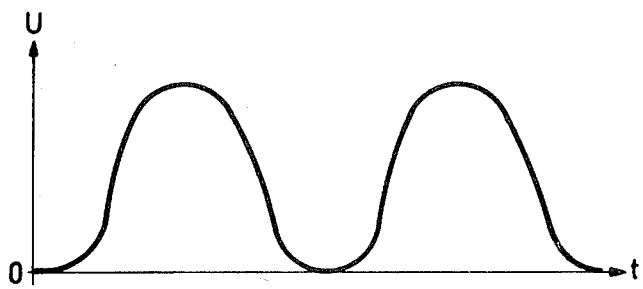
FIG. 7 shows the current signal proportional to the mains alternating current at the input of the differential amplifier in the circuit of FIG. 1.
Figure 8:
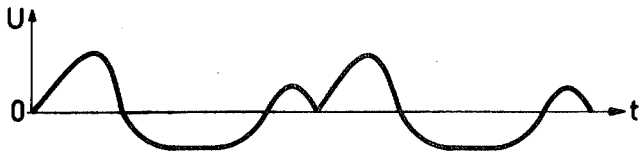
FIG. 8 shows the output signal of the differential amplifier.

The arrangement described so far is to some extent a conventional bridge circuit having all the known properties, such as, for example, that cataphoresis is avoided and that the light output increases in some lamp types. However, in the circuit arrangement shown in FIG. 1 the clock frequency of the bridge transistors is varied during each half cycle of the mains alternating voltage in the following manner: Across a measuring resistor 17 included in the current supply lead to the fullwave rectifier 3, a voltage proportional to the mains alternating current is derived and supplied through a linear rectifier 18 to a first input E1 of a differential amplifier 19. Furthermore a part of the mains alternating voltage is applied through a potentiometer 20 to a second linear rectifier 21 and then to a second input E2 of the differential amplifier 19. Consequently, at this second input E2 a rectified sinusoidal voltage is present whose amplitude can be adjusted by the potentiometer 20 and which serves as a reference signal (FIG. 6) for controlling the mains alternating current. This sinusoidal signal is then compared with the mains a.c. signal present at the first input E1 (FIG. 7). The differential amplifier 19 supplies an output voltage which is proportional to the instantaneous value of the difference between the mains a.c. signal and the sinusoidal reference signal (FIG. 8). In FIGS. 6 to 8, the input and output signals of the differential amplifier 19 are shown diagrammatically for a deviation of the mains alternating current from the sinusoidal form which for the sake of clarity is exaggerated with respect to the actual situation. For the suppression of control oscillations it may then be advantageous to vary during each half cycle the amplification of the differential amplifier 19 so that the output signal is proportional to the relative deviation between the mains alternating current I and the reference signal R, that is to say proportional to $(R-I)/R$. This output signal is then fed to a voltage-controlled pulse oscillator 22 which produces a pulsatory voltage having a fixed frequency $f_o$ at an input voltage zero, which is reduced for a positive input voltage and is raised for a negative input voltage correspondingly. This pulsatory voltage of variable frequency f is then fed to the transistor control circuit 15 which in turn switches the transistor bridge at this frequency f.

Figure 9:
FIG. 9 shows the pulses supplied to the control circuit of the transistor bridge.

When consequently the instantaneous mains alternating current lies below the given sinusoidal reference signal, the switching frequency of the transistor bridge is reduced, whereupon the impedance of the choke coil 13 decreases and hence the current derived from the mains increases. Conversely, with an instantaneous mains alternating current exceeding the reference signal, the switching frequency is raised, as a result of which the impedance of the choke coil 13 increases and the mains current decreases. Such a frequency variation of the pulse sequence present at the output 16 of the transistor control circuit 15 is shown in FIG. 9, the frequency and the frequency variation being larger in the actual situation.

The circuit arrangement described represents a proportional control circuit which ensures that a current as sinusoidal as possible is compulsorily derived from the mains. The effective value of the current and hence the lamp power can be adjusted through the value of the reference signal and consequently, for example, of the potentiometer ratio. Also lamps of lower powers can thus be operated advantageously. For example, a 60 W high pressure metal halide lamp and a 40 W high-pressure mercury lamp were both operated with a constant frequency and with the frequency control described. In Tables I and II the associated data for the low-frequency Fourier components of the mains alternating current are indicated. It can be seen that with the frequency variation especially the 3$^{rd}$ harmonic is considerably reduced. For the pulse oscillator 22 and the transistor control circuit 15 use was made of the integrated standard element TL 494 CN of Texas Instruments. In the Tables are given the proportions of the harmonics in % of the fundamental (50 Hz).

TABLE I

| | 60 W metal halide lamp | |
|---|---|---|
| Harmonic No. | f = 4.5 KHz | f variable |
| 3 (150 Hz) | 17.5% | 7.1% |
| 5 (250 Hz) | 9.6% | 4.1% |
| 7 (350 Hz) | 3.8% | 2.2% |
| 9 (450 Hz) | 2.0% | 1.8% |

TABLE II

| 40 W high-pressure mercury vapour lamp | | |
| --- | --- | --- |
| Harmonic No. | f = 10.7 KHz | f variable |
| 3 (150 Hz) | 15.8% | 8.9% |
| 5 (250 Hz) | 6.7% | 5.0% |
| 7 (350 Hz) | 1.6% | 2.2% |
| 9 (450 Hz) | 1.7% | 1.3% |

In the embodiment described so far, the lamp was operated with alternating current. For very small high-pressure gas discharge lamps, in particular for metal halide discharge lamps, operation with direct current pulses is also suitable. In this case, the lamp 14 in the circuit arrangement of FIG. 1 could be removed from the transverse branch of the bridge and could be connected between the rectifier arrangement 3,4 and the transistor bridge 5–8, for example, between the points M and N or P and Q. The choke coil 13 then remains alone in the transverse branch of the bridge.

What is claimed is:

1. A circuit arrangement for operating a high-pressure gas discharge lamp with high frequency current comprising: a pair of input terminals for connection to a low frequency AC source of voltage, a bridge circuit comprising four transistors, a full-wave rectifier coupled between said input terminals and said bridge circuit so as to supply a direct voltage to the bridge circuit, means connecting a choke coil in series with the discharge lamp with the coil connected in a transverse branch of said bridge circuit, and means responsive to a current derived from said AC voltage source for supplying switching pulses to control electrodes of said transistors so as to vary the switching frequency of the transistor bridge within each period of the AC voltage and as a function of said derived current.

2. A circuit arrangement as claimed in claim 3 wherein said means for supplying switching pulses comprises: a resistor connected in a current supply lead between one of said input terminals and the full-wave rectifier so as to develop thereacross a voltage proportional to an alternating current derived from the AC voltage and supplied through a rectifier to a first input of a differential amplifier, means for supplying a part of the AC voltage via a further rectifier to a second input of the differential amplifier, means connecting an output of the differential amplifier to a voltage-controlled pulse oscillator which produces output pulses having a frequency dependent upon the output signal of the differential amplifier, and means coupling the output pulses of the pulse oscillator to a control circuit of the transistor bridge.

3. A circuit arrangement as claimed in claim 1 wherein said lamp and said choke coil are both serially connected in the transverse branch of the bridge circuit.

4. A circuit arrangement as claimed in claim 1 wherein said means for supplying switching pulses comprises: means responsive to an AC line current flow between an input terminal and the full wave rectifier to produce a rectified alternating voltage proportional to said AC line current, means responsive to an AC voltage at the input terminals for deriving a rectified sinusoidal reference voltage, means for comparing said rectified voltage with said rectified reference voltage to produce an output voltage determined by the instantaneous difference therebetween, and a control circuit controlled by said output voltage to derive said switching pulses at a high frequency relative to the low frequency AC voltage at the input terminals and with the frequency of said switching pulses being variable during each half cycle of the AC input voltage as a function of the AC line current, whereby a sinusoidal current is maintained at the input terminals.

5. A circuit arrangement as claimed in claim 4 further comprising a high frequency LC filter coupling said input terminals to said full wave rectifier.

6. A circuit arrangement as claimed in claim 4 wherein said control circuit further comprises a voltage controlled oscillator responsive to the output voltage of the comparing means to derive output pulses whose frequency is dependent upon said output voltage.

7. A circuit arrangement as claimed in claim 1 further comprising a capacitor coupled across output terminals of the full wave rectifier and of a value such that a rectangular pulse shaped lamp voltage is developed having a sinusoidal envelope of twice the frequency of the AC source voltage.

8. A circuit arrangement for operating a high-pressure gas discharge lamp with high frequency current comprising: two input terminals to be connected to a conventional AC voltage supply, means connecting the two input terminals to a full-wave rectifier, means connecting output terminals of said full-wave rectifier to a bridge circuit comprising four transistors, a choke coil connected in series with the lamp with the choke coil connected in a transverse branch of the bridge circuit, means connecting base electrodes of the four transistors to output terminals of a control circuit that produces high frequency switching pulses for the bridge transistors, a resistor connected between one input terminal and the full-wave rectifier with a junction between the resistor and the full-wave rectifier connected via a rectifier to a first input of a differential amplifier, means connecting a potentiometer to the input terminals, means connecting a tap on the potentiometer through a further rectifier to a second input of the differential amplifier, means connecting an output of the differential amplifier to an input of a voltage-controlled pulse oscillator, and means connecting an output of the voltage-controlled pulse oscillator to an input of the control circuit.

9. A circuit arrangement as claimed in claim 8 wherein said lamp and said choke coil are both serially connected in the transverse branch of the bridge circuit.

* * * * *